United States Patent [19]

Wenninger

[11] 3,926,069

[45] Dec. 16, 1975

[54] BREAKAWAY UNIVERSAL JOINT ASSEMBLY

[75] Inventor: Josef Wenninger, Vorsfelde, Germany

[73] Assignee: Volkswagenwerk Aktiengesellschaft, Wolfsburg, Germany

[22] Filed: Oct. 18, 1974

[21] Appl. No.: 515,982

[30] Foreign Application Priority Data
Oct. 30, 1973  Germany............................ 2354165

[52] U.S. Cl. ...................... 74/492; 74/496; 408/57; 64/17 R
[51] Int. Cl.² .......................................... B62D 1/16
[58] Field of Search ........ 74/492, 493, 496; 408/57; 64/17 R, 17 A

[56] References Cited
UNITED STATES PATENTS

| | | | |
|---|---|---|---|
| 3,329,040 | 7/1967 | Stein | 74/492 |
| 3,472,093 | 10/1969 | Tenniswood | 74/492 |
| 3,477,307 | 11/1969 | Maddox | 74/492 |
| 3,600,969 | 8/1971 | Pitner | 74/492 |
| 3,760,649 | 9/1973 | Decouzon | 74/492 |

Primary Examiner—Samuel Scott
Assistant Examiner—Randall Heald
Attorney, Agent, or Firm—Brumbaugh, Graves, Donohue & Raymond

[57] ABSTRACT

A safety steering column extends between a steering wheel assembly for a vehicle and a steering gear assembly for the vehicle. A breakaway universal joint assembly in the steering column includes a spider having four arms disposed in a cross-like configuration. A first yoke is releasably coupled to a first two opposed arms of the spider, while a second yoke is coupled to the other two opposed arms of the spider. The first yoke is formed with two pockets that open in directions generally parallel to a longitudinal axis of the steering column and the end portions of the corresponding arms of the spider are releasably press-fit into the pockets. Thus, when a load in excess of a predetermined release load is exerted on the joint assembly, the first yoke will release the ends of the spider arms.

5 Claims, 2 Drawing Figures

BREAKAWAY UNIVERSAL JOINT ASSEMBLY

BACKGROUND OF THE INVENTION

In a collision involving a vehicle, such as an automobile, particularly in a serious head-on collision, the steering column that operatively couples the steering wheel assembly to the steering gear assembly and the axle for the front wheels, for example, may be forced into the passenger compartment of the vehicle due to deformation of the front of the body of the vehicle. In order to avoid any serious injuries to the operator of a vehicle resulting from the steering column being forced into the passenger compartment, steering columns have been proposed that are constructed in two parts capable of moving axially relative to one another. In a collision, therefore, such two-part steering columns can accommodate significant deformation of the front portion of a vehicle body without significant movement of the column into the passenger compartment.

In one type of a two-part steering column, one part of the column is hollow and has a larger diameter than the other part. Upon the application of an axial impact load, the part of the column having the smaller diameter telescopes into the part having the larger diameter. Such a two-part steering column is described and illustrated in Bogosoff et al. U.S. Pat. No. 3,394,612, for example.

In another type of a two-part steering column, the two parts of the column are separated and the resulting gap is bridged by a shock absorbing element. Two-part steering columns of the second type are described and illustrated in Orlich et al. U.S. Pat. No. 3,482,466, German Patentschrift No. 1,298,010 and German Auslegeschrift No. 1,655,581. In a particular embodiment of a two-part steering column that includes an intermediate shock absorber portion, the opposite ends of the column are coupled to the steering wheel shaft and to a steering gear assembly by joints, such as universal joints, that are relatively torsion-stiff. During a frontal collision, the steering column deforms into a lightning-like shape. The construction of such a steering column is described and illustrated in the biweekly German magazine "MOT", at pages 50 and 52 of the Oct. 19, 1968 issue.

A third type of a two-part steering column utilizes a releasable connecting element that couples together the two parts of the steering column. Even when a very small axial load is exerted on the steering column, the connecting element can release the two parts of the column from each other so that the column buckles. Such a steering column is described and illustrated in the German publication "Automobiltechnische Zeitschrift" Volume 11 (1972), at page 441. The column construction described immediately above can be used not only in substantially straight-line steering columns, but also in steering columns that are jointed to permit a steering wheel, for example, to be tilted and otherwise adjusted for the convenience of the driver. The use of a releasable connection in a jointed steering column is described and illustrated in the French magazine "Revue Technique Automobil", at pages 84 and 85 of the February 1973 issue, No. 321.

SUMMARY OF THE INVENTION

The present invention is directed to a breakaway universal joint assembly for a steering column of a vehicle, such as an automobile, which is designed to occupy a minimum of space and to buckle in a safe manner, in the event of an accident, to avoid injuries to the driver of the vehicle. According to the invention, the breakaway universal joint assembly is used in a safety steering column that extends between the steering wheel assembly and the steering gear assembly of a vehicle. The joint assembly includes a spider having four arms disposed in a cross-like configuration and a pair of yokes coupled to opposed arms of the spider. One yoke is releasably coupled to a first two opposed arms of the spider, while the second yoke is coupled to a different two opposed arms. Two pockets are formed in the first yoke, each of which receives an end portion of one of the corresponding opposed arms of the spider. The pockets open in directions generally parallel to a longitudinal axis of the steering column and the end portions of the opposed arms releasably press-fit into the pockets. Thus, when axial impact load in excess of a predetermined release load is exerted on the steering column, the opposed arms of the spider which are press-fit into the first yoke will pop out of the pockets in the yoke. The steering column will then effectively buckle or collapse without being forced into the passenger compartment of the vehicle.

The pockets of the first yoke may open either toward the steering wheel assembly or toward the steering gear assembly. In a preferred embodiment, resilient bearing members are disposed in the pockets between the walls of the pockets and surfaces of the end portions of the two spider arms.

BRIEF DESCRIPTION OF THE DRAWINGS

For a better understanding of the invention, reference may be made to the following description of two exemplary embodiments, taken in conjunction with the figures of the accompanying drawings, in which.

DESCRIPTION OF EMBODIMENTS

Figure 1:
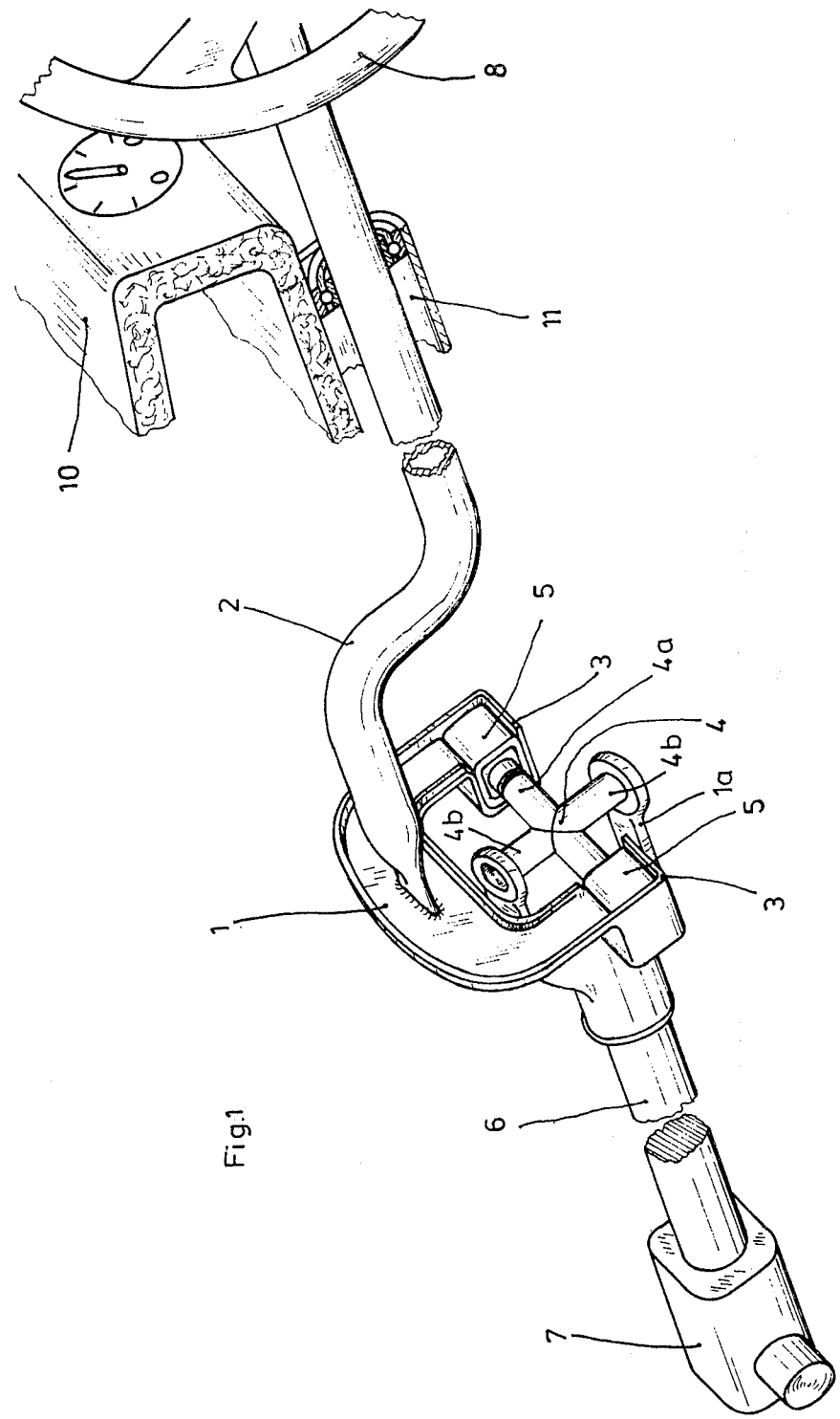
FIG. 1 is a perspective view of a safety steering column incorporating a breakaway universal joint assembly according to the invention.

FIG. 1 of the drawings illustrates a part of a steering train for a vehicle, such as an automobile. Beginning at the right-hand side of FIG. 1, the steering train comprises a steering wheel assembly that includes a steering wheel 8. The steering wheel 8 is rigidly coupled to an upper part 2 of a rotatable composite steering column or shaft, which is rotatably journaled in a bearing block 11 connected to the automobile body 10. The upper part 2 of the composite shaft extends from the steering wheel 8 to a universal joint assembly that couples the upper shaft part 2 to a lower part 6 of the composite shaft. The lower end of the shaft part 6 is coupled to a steering gear assembly that includes a steering gear 7. Thus, the composite steering shaft or column joins the automobile steering wheel 8 to the steering gear or box 7 so that rotational movement of the steering wheel is transmitted to the steering gear and hence reflected in a related change in the orientation of the front axle and wheels (not shown).

The universal joint assembly includes a cross-shaped spider 4 and a pair of bows or yokes 1 and 1a. In FIG. 1, yoke 1 is rigidly connected, by welding, for example, to the upper part 2 of the composite steering column, while yoke 1a is rigidly connected to the lower part 6 of the composite steering column. The ends of two oppositely extending arms 4a of the cross-like spider 4 are articulated in the ends of the yoke 1, while the ends of the remaining two opposed arms 4b of the spider are similarly engaged with the ends of the yoke 1a. Thus, the assembled universal joint bears a general resemblance to a typical Hooke-or cardan-type universal joint.

The universal joint assembly becomes breakaway in nature by having the ends of the yoke 1 formed as pockets 3 which open in directions generally parallel to the longitudinal axis of the composite steering column, so that the ends of the arms 4a of the spider 4 can be press-fit into the pockets. To facilitate the press-fit engagement of the ends of the spider arms 4a in the pockets 3, resilient bearing members 5 are fitted around the end portions of the arms. Thus, when the joint is assembled, the resilient bearings will be disposed between the spider arms 4a and the walls of the pockets 3. The bearing members 5 may be made of rubber or any other durable, resilient material. The pockets 3, the bearing members 5 and the end portions of the arms 4a of the spider 4 are appropriately dimensioned so that the spider arms will be forced from the pockets 3 when a load exceeding a predetermined load is exerted on the universal joint through the composite steering column. The other two opposed arms 4b of the spider 4 will remain in the yoke 1a, as in a conventional universal joint.

Figure 2:
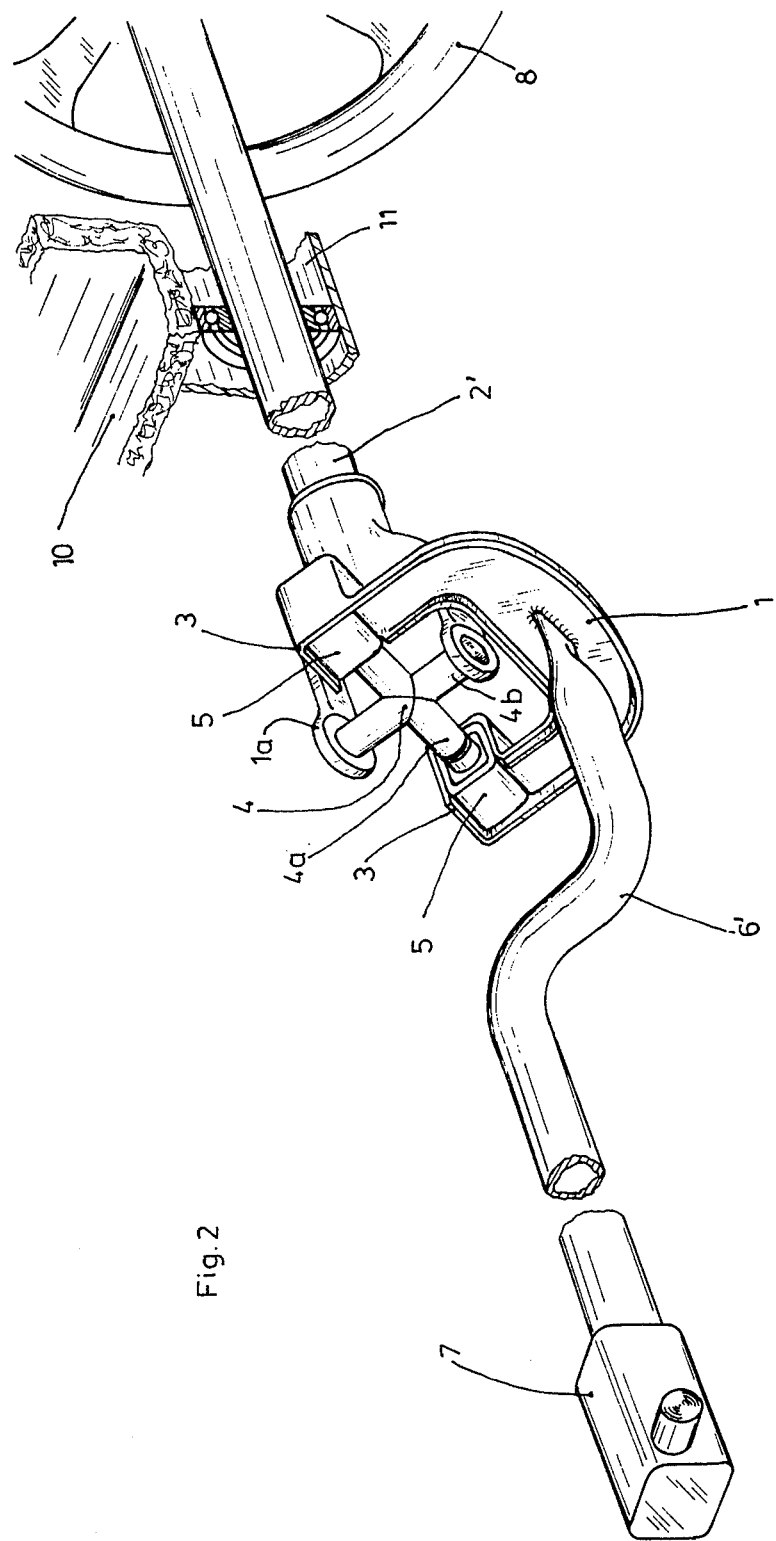
FIG. 2 is a perspective view of a second embodiment of a safety steering column incorporating a universal joint assembly according to the invention.

In a safety steering column such as illustrated in FIG. 1, the spider arms 4a will be forced from the pockets 3 of the yoke 1 when a given axial load or force on the column is exceeded so that there is no danger that the column will be pushed into the passenger compartment of the vehicle. A similar safety steering column is illustrated in FIG. 2 of the drawings, in which like reference numerals are used for like components. The yoke 1 of the embodiment of FIG. 2 is connected to the lower part 6' of the steering column and the pockets 3 of the yoke 1 are directed toward the steering gear 7, rather than toward the steering wheel 8. In both constructions, the upper part 2 or 2' of the composite steering column remains in a generally fixed position, in the event of a collision, because of the restraining action of the bearing block 11, while the lower part 6 or 6' of the composite steering column moves in a generally axial direction.

A safety steering column utilizing the breakaway universal joint assembly described above has significant advantages over jointed steering columns utilizing both universal joints and a releasable connector, since the breakaway feature of the steering column is combined with a universal joint to minimize both the space and the number of component parts required for such a construction. It will be appreciated that while the illustrated steering columns utilize only a single universal joint, the inventive breakaway universal joint may be employed in a safety steering column having more than one universal joint, if additional articulation of the column is desired. Normally, however, only a single breakaway universal joint would be used in such a multi-joint column. The breakaway construction of the invention can also be used for other joints that resemble universal joints in design or function.

It will be understood that the embodiments described above are merely exemplary and that persons skilled in the art may make many variations and modifications without departing from the spirit and scope of the invention. All such modifications and variations are intended to be within the scope of the invention as defined in the appended claims.

I claim:

1. In a safety steering column for a vehicle having a steering wheel assembly and a steering gear assembly, the steering column extending between the steering wheel assembly and the steering gear assembly, the improvement comprising a breakaway universal joint assembly that includes a spider having four arms disposed in a cross-like configuration, a first yoke releasably coupled to a first two opposed arms of the spider, and a second yoke coupled to a second two opposed arms of the spider, the first yoke being adapted to release the first two opposed arms in response to a load exerted on the joint assembly which exceeds a predetermined load and which is exerted in a direction generally parallel to a longitudinal axis of the steering column.

2. An improvement according to claim 1, wherein the first yoke is formed with two pockets that each receive an end portion of a different one of said first two opposed arms, the pockets being open in directions generally parallel to a longitudinal axis of the steering column and the end portions of the first two opposed arms being releasably press-fit into said pockets.

3. An improvement according to claim 2, wherein said pockets open toward the steering wheel assembly and the first yoke is rigidly connected to a portion of the steering column extending between the breakaway universal joint assembly and the steering wheel assembly.

4. An improvement according to claim 2, wherein said pockets open toward the steering gear assembly and the first yoke is rigidly connected to a portion of the steering column extending between the breakaway universal joint assembly and the steering gear assembly.

5. An improvement according to claim 2, wherein the breakaway universal joint assembly also includes resilient bearing members disposed in said pockets between walls of said pockets and surfaces of the end portions of the first two opposed arms.

* * * * *